United States Patent
Nishitani

(10) Patent No.: US 9,061,523 B2
(45) Date of Patent: Jun. 23, 2015

(54) IMAGE FORMING APPARATUS, CONTROL METHOD THEREOF, AND COMPUTER READABLE INFORMATION RECORDING MEDIUM

(75) Inventor: Katsuaki Nishitani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 87 days.

(21) Appl. No.: 13/374,124

(22) Filed: Dec. 13, 2011

(65) Prior Publication Data

US 2012/0154470 A1  Jun. 21, 2012

(30) Foreign Application Priority Data

Dec. 16, 2010  (JP) ................................. 2010-280074
Dec. 1, 2011  (JP) ................................. 2011-264017

(51) Int. Cl.
    B41J 29/38  (2006.01)
    B41J 3/60   (2006.01)
    B41J 2/21   (2006.01)
    H04N 1/60   (2006.01)
    G06K 15/02  (2006.01)

(52) U.S. Cl.
    CPC .... B41J 3/60 (2013.01); B41J 2/21 (2013.01); H04N 1/605 (2013.01); G06K 15/1868 (2013.01)

(58) Field of Classification Search
    CPC ....................................................... B41J 29/38
    See application file for complete search history.

(56) References Cited

U.S. PATENT DOCUMENTS

| | | | |
|---|---|---|---|
| 6,955,486 B2 | 10/2005 | Nishitani | |
| 7,134,797 B2 | 11/2006 | Nishitani | |
| 7,251,421 B2* | 7/2007 | Yoshizuka et al. | 399/43 |
| 7,782,486 B2 | 8/2010 | Nakano et al. | |
| 2006/0238555 A1* | 10/2006 | Couwenhoven et al. | 347/15 |
| 2007/0106962 A1* | 5/2007 | Sakakibara et al. | 716/1 |
| 2009/0237757 A1* | 9/2009 | Sawada et al. | 358/518 |
| 2009/0244557 A1* | 10/2009 | Itagaki | 358/1.6 |
| 2010/0165365 A1* | 7/2010 | Fujii | 358/1.9 |
| 2011/0063637 A1* | 3/2011 | Kondo | 358/1.9 |
| 2011/0242175 A1* | 10/2011 | Imai | 347/15 |

FOREIGN PATENT DOCUMENTS

JP  2007-118238 A  5/2007

* cited by examiner

*Primary Examiner* — Manish S Shah
*Assistant Examiner* — Jeremy Delozier
(74) *Attorney, Agent, or Firm* — Harness, Dickey & Pierce P.L.C.

(57) ABSTRACT

An image forming apparatus includes an image forming part configured to form images on both sides of a recording medium based on image data using developers; a storing part configured to store developer using amount information for obtaining using amounts of the developers not causing bleed-through of the developers when the image forming part forms the images on both sides of the recording medium, the developer using amount information including plural items of developer using amount information separately set for respective colors of the image data; and a control part configured to cause the image forming part to use the developers and reduce using amounts of the developers when determining, based on the plural items of developer using amount information separately set for respective colors of the image data, to reduce the using amounts of the developers.

14 Claims, 9 Drawing Sheets

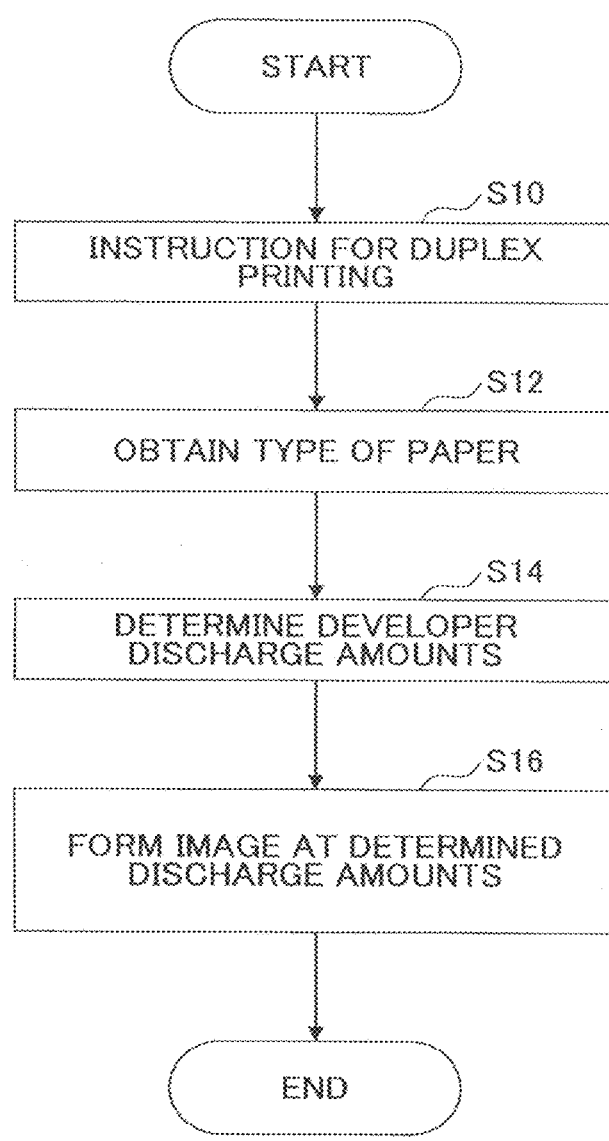

FIG.4

| COLOR / PAPER | R | RY | Y | YG | G | GO | C | CB | B | BM | M | MR |
|---|---|---|---|---|---|---|---|---|---|---|---|---|
| PLAIN PAPER | 60% | 65% | 70% | 65% | 60% | 65% | 70% | 65% | 65% | 70% | 70% | 65% |
| FILM | 40% | 45% | 50% | 45% | 40% | 45% | 50% | 45% | 45% | 50% | 50% | 45% |
| TRACING PAPER | | | | | | | | | | | | |
| GLOSSY PAPER | 30% | 35% | 40% | 45% | 30% | 35% | 40% | 35% | 40% | 40% | 40% | 35% |
| COATED PAPER | 80% | 85% | 90% | 85% | 80% | 85% | 90% | 85% | 85% | 90% | 90% | 85% |
| OHP | 30% | 35% | 40% | 45% | 30% | 35% | 40% | 35% | 40% | 40% | 40% | 35% |
| MATTE PAPER | 70% | 75% | 80% | 75% | 70% | 75% | 80% | 75% | 75% | 80% | 80% | 75% |

IMAGE FORMING APPARATUS, CONTROL METHOD THEREOF, AND COMPUTER READABLE INFORMATION RECORDING MEDIUM

BACKGROUND OF THE INVENTION

1. Field of the Invention

The present invention relates to an image forming apparatus, a control method thereof, and a computer readable information recording medium.

2. Description of the Related Art

There may be a case where in an image forming apparatus such as an ink-jet recording apparatus, a critical ink adhesion amount of paper is exceeded and so-called "bleed-through" (or "back face bleeding") such as bleeding of developers such as inks occurs in the paper when duplex printing (or double face printing in which images are formed (printed) on both sides of a recording medium) is carried out at discharge amounts of inks the same as those of simplex printing (or single face printing) as it is. Therefore, in order to avoid bleed-through, Japanese Laid-Open Patent Application No. 2007-118238 discusses uniformly reducing gamma correction parameters for CMYK data in order to reduce discharge amounts of inks to avoid bleed-through, and thus reduce the discharge amounts of inks at a time of duplex printing.

However, according to the art discussed in Japanese Laid-Open Patent Application No. 2007-118238, the gamma correction parameters for all of the colors are uniformly reduced at a time of duplex printing. Therefore, using amounts of inks for all of the colors are uniformly reduced, and thus, the using amounts of inks for the colors which do not cause bleed-through of inks in a recording medium are also reduced. Therefore, image quality at a time of duplex printing may be degraded.

SUMMARY OF THE INVENTION

According to an embodiment of the present invention, an image forming apparatus is provided which includes an image forming part configured to form images on both sides of a recording medium using developers based on image data; a storing part configured to store developer using amount information for obtaining using amounts of developers not causing bleed-through of the developers when the image forming part forms the images on both sides of the recording medium, the developer using amount information including developer using amount information set separately for respective colors of image data; and a control part configured to cause the image forming part to use the developers and reduce the using amounts of the developers when determining, based on the developer using amount information for respective colors of image data, to reduce the using amounts of the developers.

Other objects, features and advantages of the present invention will become more apparent from the following detailed description when read in conjunction with the accompanying drawings.

BRIEF DESCRIPTION OF THE DRAWINGS

FIGS. 3A and 3B show a processing flow at a time of duplex printing in the image forming apparatus according to the embodiment of the present invention;

FIG. 4 shows one example of developer using amount information (table) according to the embodiment of the present invention;

DETAILED DESCRIPTION OF THE EMBODIMENTS

Figure 1:
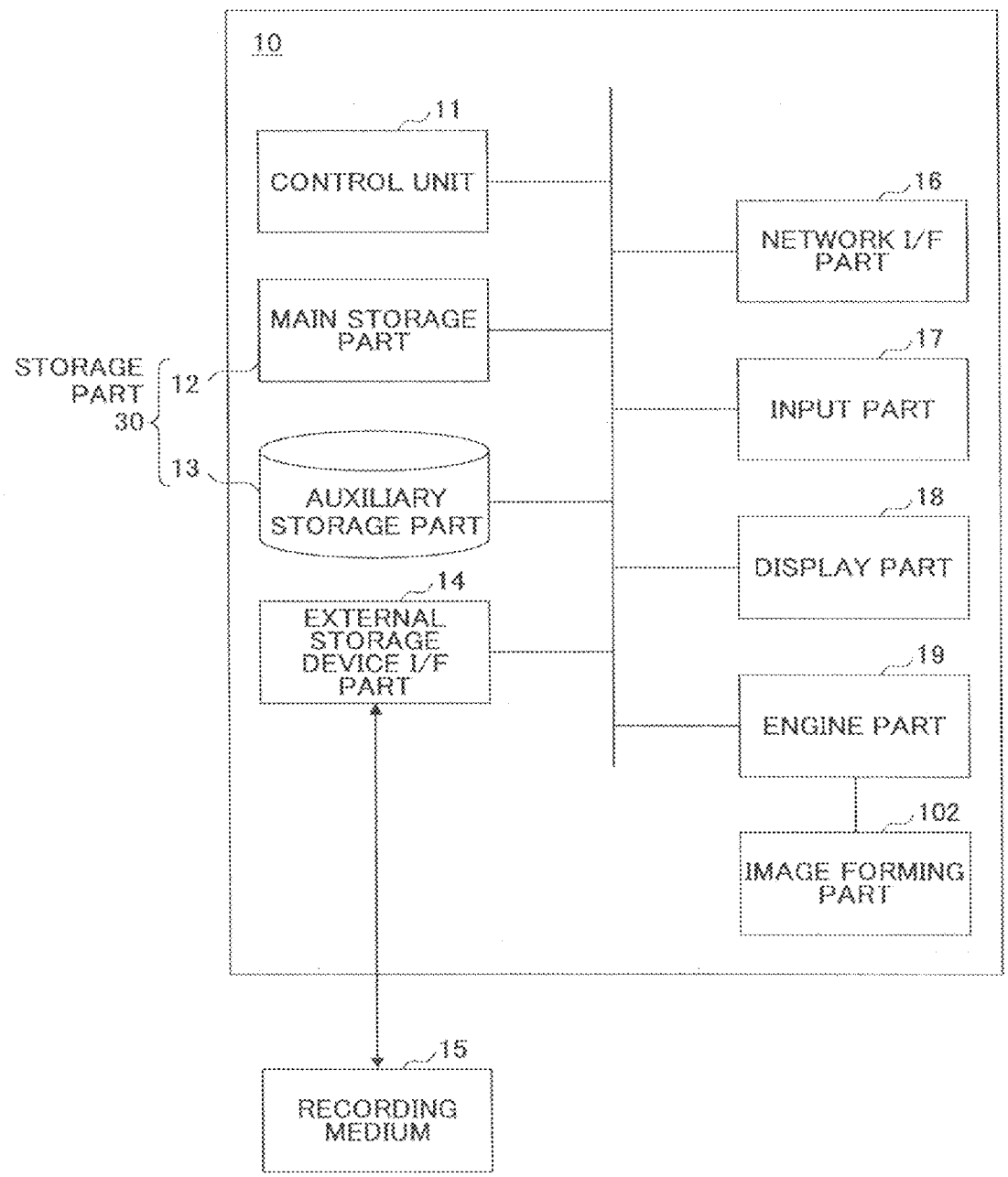
FIG. 1 shows an example of a configuration of hardware of an image forming apparatus according to an embodiment of the present invention.

In consideration of the problems in the related art mentioned above, an object of embodiments of the present invention is to provide an image forming apparatus in which when duplex printing is carried out, bleed-through of developers in a recording medium is avoided and also, degradation of image quality at a time of duplex printing is prevented to the utmost.

Image forming apparatuses according to embodiments of the present invention may include, for example, a printer, a facsimile machine, a copier such as an ink-jet recording apparatus, a plotter, a multifunction peripheral which has the functions of these apparatuses in a combined manner, and so forth. Further, recording media used in the image forming apparatuses to form (print) images may include media such as a substrate, paper, a continuous form, a thread, a fiber, leather, metal, plastic, glass, wood, ceramic, and so forth. Developers are used by the image forming apparatuses to form images on the recording medium and may include toners, inks and so forth. Below, the description will be made supposing that, for the purpose of convenience, the recording medium is paper, the image forming apparatus is an ink-jet recording apparatus and the developers are inks. Further, "bleed-through" means a phenomenon that an image printed on one face of a sheet of paper can be seen also from the other face of the sheet of paper as a result of discharge amounts of inks used for the printing being too much.

Below, the embodiments of the present invention will be described. It is noted that the same reference numerals are given to elements/components/parts having the same functions and procedures/steps carrying out the same processes, and duplicate description will be omitted.

Embodiment 1

First, a hardware configuration of an embodiment 1 of the present invention will be described. FIG. 1 shows one example of a hardware configuration of an image forming apparatus 10 according to the embodiment 1 of the present invention. As shown in FIG. 1, the image forming apparatus 10 includes a control unit 11, a main storage part 12, an auxiliary storage part 13, an external storage device I/F (interface) part 14, a network interface part 16, an input part 17, a display part 18 and an engine part 19.

The control unit 11 includes a central processing unit (CPU) that carries out control of the respective parts of the image forming apparatus 10, arithmetic operations of data, conversion of data, and so forth. Further, the control unit 11 includes an arithmetic and logic unit that executes a program stored in the main storage part 12, receives data from an input unit (the input part 17 or such) or a storage unit (a storage part 30 or such), carries out arithmetic and logic operations or conversion, and outputs the resulting data to an output unit (the display part 18 or such) or the storage unit.

The main storage part 12 includes a read only memory (ROM), a random access memory (RAM) and so forth, is included in the storage unit, and stores or temporarily holds an operating system (OS) that is basic software, application software, and so forth to be executed by the control unit 11, and image data.

The auxiliary storage part 13 includes a hard disk drive (HDD) or such, is also included in the storage unit, and stores data concerning the application software and so forth.

The main storage part 12 and the auxiliary storage part 13 are integrally referred to as the storage part 30.

The external storage device I/F part 14 provides an interface between a recording medium 15 (for example, a flash memory, a SD card or the like) connected via a data transmission path such as a universal serial bus (USB) and the image forming apparatus 10.

Further, for a program stored in the recording medium 15, the program may be installed in the image forming apparatus 10 via the external storage device I/F part 14, and the image forming apparatus 10 may execute the thus-installed program.

The network interface part 16 provides an interface between a peripheral device (not shown) and the image forming apparatus 10. The peripheral device has a communication function, and is connected via a communication network such as a local area network (LAN) or a wide area network (WAN) configured by using data paths such as cables/wires and/or radio communication lines.

The input part 17 and the display part 18 include a liquid crystal display (LCD) device including key switches (hardware keys) and a touch panel function (including software keys of a graphical user interface (GUI)), and act as a display and input unit functioning as a user interface (UI) used when the user uses the functions of the image forming apparatus 10.

The engine part 19 drives an image forming part 102, for example. The image forming part 102 forms an image on a sheet of paper by discharging inks onto the sheet of paper based on image data obtained by the control unit 11. As for the details of the engine part 19, a device known in the art may be applied.

Figure 2:
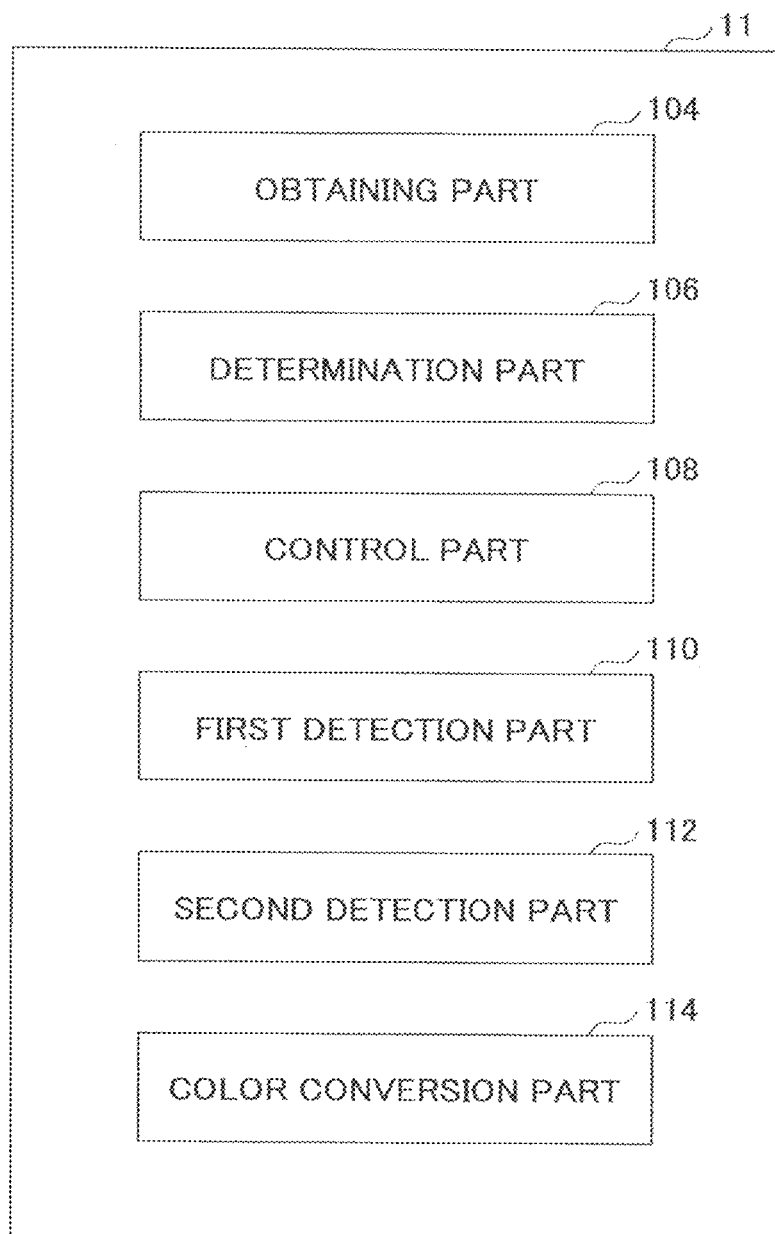
FIG. 2 shows an example of a configuration of functions of a control unit according to the embodiment of the present invention.
Figure 3B:
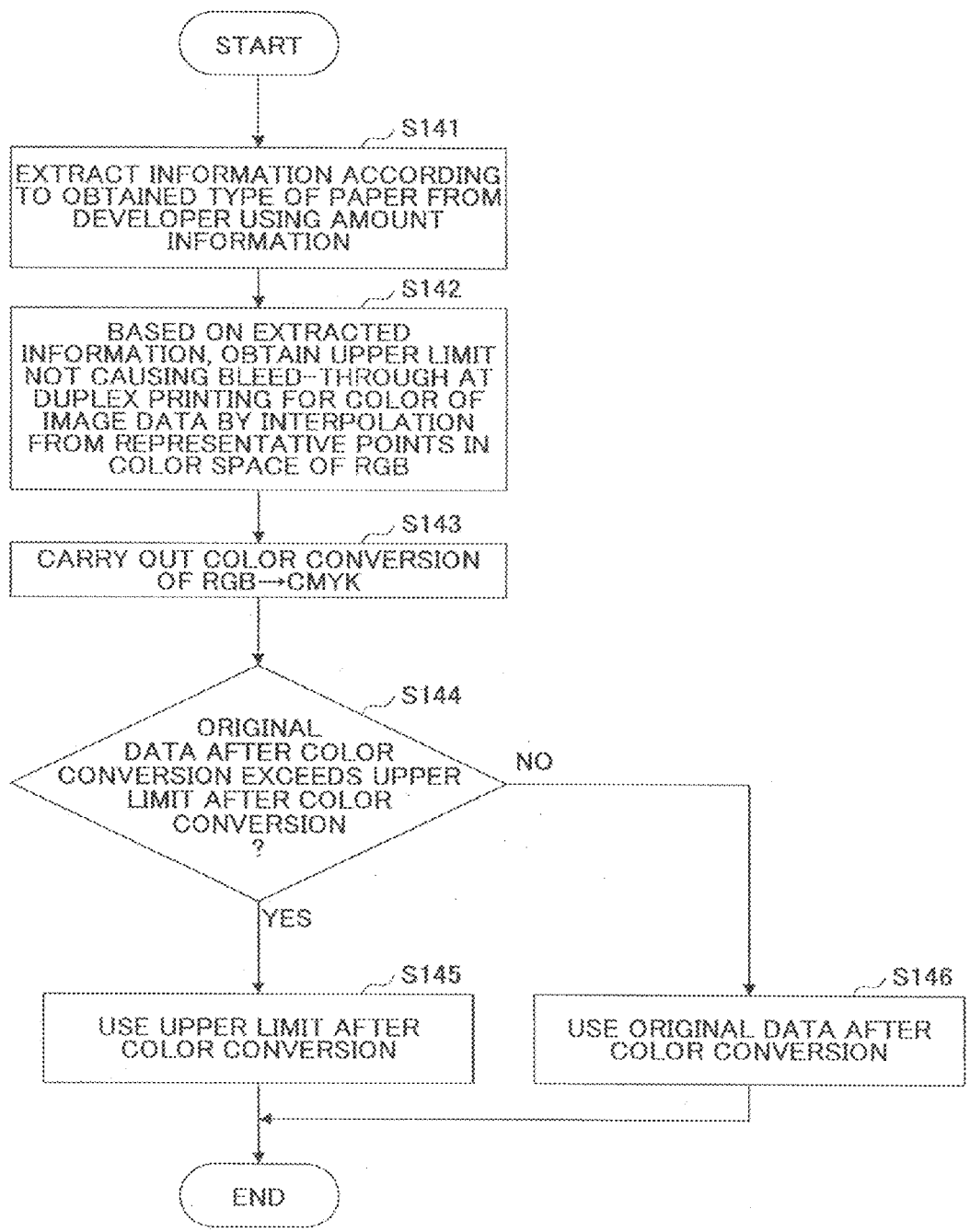

Next, FIG. 2 shows an example of a functional configuration of the control unit 11, and FIGS. 3A and 3B show a processing flow of the image forming apparatus 10 in the embodiment 1 at a time of duplex printing. The respective functions included in the functional configuration of the control unit 11 shown in FIG. 2 are realized as a result of the CPU of the control unit 11 executing the above-mentioned program, for example.

The user inputs, from the input part 17, instructions to form images on both sides of a sheet of paper (step S10 of FIG. 3A). It is noted that when the user does not input, from the input part 17, instructions to form images on both sides of a sheet of paper, the image forming apparatus 10 forms an image or images through ordinary image forming (printing) operations. As for specific procedures of the ordinary image forming operations, known image forming operations may be applied.

As a result of step S10, the image forming part 102 forms images on both sides of a sheet of paper (not shown) under the control of the control unit 11 based on image data obtained as a result of, for example, a reading part (a scanner or such, not shown) of the image forming apparatus 10 reading original images.

For this purpose, the image forming part 102 is configured to form images on both sides of a sheet of paper. In the case where the image forming apparatus 10 is an ink-jet recording apparatus, the image forming part 102 corresponds to a recording head. As for the derails of a paper supply mechanism and so forth that conveys a sheet of paper when the recording head, i.e., the image forming part 102, forms images on both sides of the sheet of paper, a device known in the art may be applied.

After the user thus inputs the instructions to form images on both sides of a sheet of paper in step S10 as mentioned above, an obtaining part 104 obtains the type of the sheet of paper on which images are thus formed by the image forming part 102 (step S12). How the obtaining part 104 obtains the type of the sheet of paper will now be described. A first method of obtaining the type of the sheet of paper is to obtain the type of the sheet of paper as a result of the user inputting the type of the sheet of paper from the input part 17. In this case, the obtaining part 104 obtains the type of the sheet of paper thus input by the user from the input part 17. Alternatively, the user may input the type of the sheet of paper from a printer driver of an external apparatus (for example, a personal computer, not shown).

As second method of obtaining the type of the sheet of paper is to automatically obtain, by the obtaining part 104, the type of the sheet of paper that is set by the user in the image forming apparatus 10. For example, identification information indicating the type of the sheet of paper is previously attached to the sheet of paper, the obtaining part 104 reads the identification information from the sheet of paper, and thus obtains the type of the sheet of paper.

Next, a determination part 106 determines, based on the obtained type of the sheet of paper, discharge amounts of inks causing bleed-through of the inks, when the image forming part 102 forms (i.e., prints) the images on both sides of the sheet of paper, for the respective colors of the image data (step S14).

It is noted that in the storage part 30, developer using amount information is stored in which types of sheets of paper and discharge amounts of inks for respective colors not causing bleed-through of inks when the image forming part 102 forms images on both sides of a sheet of paper are associated with each other. FIG. 4 shows one example of a table of the developer using amount information. The table of FIG. 4 may be previously created based on experimentally obtained numerical values, for example. The example of FIG. 4 shows ratios of discharge amounts of inks for respective colors, and shows a ratio (%) of a discharge amount of ink assuming a case where when each of the respective colors (representative colors) is formed on a sheet of paper, a discharge amount of ink of the ordinary case where the discharge amount of ink is not limited at all, i.e., large droplets of the inks are discharged and the entirety of a certain area of the sheet of paper is completely filled with the ink droplets is determined as 100%.

Further, in the example of FIG. 4, the ratios of discharge amounts of inks are separately set for the respective twelve representative colors, i.e., R (red), RY (red yellow), Y (yellow), YG (yellow green), G (green), GC (green cyan), C (cyan), CB (cyan blue), B (blue), BM (blue magenta), M (magenta) and MR (magenta red). It is noted that the developer using amount information is not limited to the above-mentioned example where the ratios of discharge amounts of inks for the respective colors (representative colors) are set, and instead, other parameters of discharge amounts of inks for the respective colors may be set.

The example of FIG. 4 shows that in a case where the type of the sheet of paper is plain paper and the red color (R) is formed (see the top left field in the table of FIG. 4), for example, the ratio of discharge amount of ink is set to be equal to or less than 60% (upper limit) of the discharge amount of ink of the above-mentioned ordinary case where the discharge amount of ink is not limited at all. This is because if the discharge amount of ink exceeds 60%, bleed-through of ink may occur at a time of duplex printing.

Figure 5:
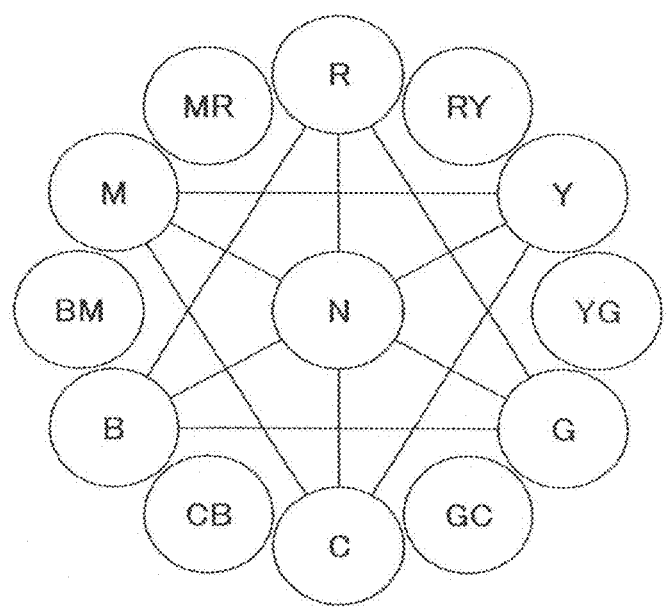
FIG. 5 shows correlation of colors in the embodiment of the present invention.

Further, FIG. 5 shows correlation of the twelve colors of the representative colors. In the example of FIG. 5, for example, it is indicated that red (R) has a correlation with B (blue) and G (green).

The determination part 106 carries out color correction using a color correction profile. In this case, the determination part 106 uses a three-dimensional look up table LUT) (not shown) concerning a color space of RGB (red, green and blue), and carries out correction of the respective colors of the image data. At this time, the determination part 106 carries out interpolation operations from representative points in the color space, and carries out correction of the respective colors of the image data.

Then, the determination part 106 determines ratios of discharge amounts of inks for forming the respective colors of the image data in such a manner that the ratios of discharge amounts of inks (upper limits) shown in the table of FIG. 4 are not exceeded. For example, in particular, as for the 12 colors of the representative colors shown in the table of FIG. 4, control is carried out as described below depending on whether the ratios of discharge amounts of inks of the respective colors obtained from the above-mentioned color correction using the color correction profile exceed the ratios of discharge amounts of inks (upper limits) shown in the table of FIG. 4. That is, in a case where the ratios of discharge amounts of inks of the respective colors obtained from the above-mentioned color correction exceed the ratios of discharge amounts of inks (upper limits) shown in the table of FIG. 4, the ratios of discharge amounts of inks (upper limits) shown in the table of FIG. 4 are used. In contrast thereto, in a case where the ratios of discharge amounts of inks of the respective colors obtained from the above-mentioned color correction do not exceed the ratios of discharge amounts of inks (upper limits) shown in the table of FIG. 4, the ratios of discharge amounts of inks obtained from the color correction are used as they are.

As for colors other than the above-mentioned 12 colors of the representative colors and the middle tone colors (described later) thereof, interpolation operations from the representative points of the 12 colors in the RGB color space are carried out, for example, and ratios of discharge amounts of inks for the colors (upper limits) are obtained for these colors and the middle tone colors thereof. Then, in a case where the ratios of discharge amounts of inks of the respective colors obtained from the above-mentioned color correction exceed the ratios of discharge amounts of inks (upper limits) obtained from the interpolation operations, the ratios of discharge amounts of inks (upper limits) obtained from the interpolation operations are used. In contrast thereto, in a case where the ratios of discharge amounts of inks of obtained from the color correction do not exceed the ratios of discharge amounts of inks (upper limits) obtained from the interpolation operations, the ratios of discharge amounts of inks obtained from the color correction are used as they are. The details of the control operations will be described later using specific examples.

When the determination part 106 has thus determined the discharge amounts (or ratios of discharge amounts) of inks for the respective colors of the image data (step S14), a control part 108 controls the image forming part 102, and causes the image forming part 102 to form images based on the determined discharge amounts (or ratios of discharge amount) of inks (step S16).

Next, how to obtain specific discharge amounts (or ratios of discharge amounts) of inks by the determination part 106 will be described with reference to FIG. 3B. For the purpose of simplification of the description, the above-mentioned LUT is not considered (i.e., the color correction using the color correction profile is not considered), and first, a case where the image data is RGB (255, 0, 0) (i.e., the image data includes only the red color) is supposed, and the description will be made.

When the obtaining part 104 has obtained the type of the sheet of paper as mentioned above (step S12 of FIG. 3A), the determination part 106 determines a ratio of a discharge amount using the table (developer using amount information) of FIG. 4. As an example, it is supposed that the type of the sheet of paper is "plain paper". Since as mentioned above, the image data is the red color (R), and the type of the sheet of paper is plain paper, the ratio of discharge amount of ink (upper limit) is determined as "60%" (step S141 of FIG. 3B).

Then, a color conversion part 114 (see FIG. 2) carries out color conversion of the above-mentioned image data from RGB values into CMYK values (step S143). It is noted that the CMYK values are data concerning colors CMYK of developers, and the colors CMYK (cyan, magenta, yellow, black) of the developers to be actually used (discharged) and the using (discharge) amounts thereof are determined by the CMYK values. For the purpose of convenience, the CMYK values themselves will be referred to as "discharge amounts of inks", hereinafter. By the color conversion, the red color (R) is converted into magenta (M) and yellow (Y). Therefore, in this example, the color correction part 114 converts the above-mentioned RGB values (255, 0, 0) of the image data into the CMYK values (0, 255, 255, 0). Since R (red) is included in the 12 colors of the representative colors, interpolation operations in step S142 are not necessary, and step S142 is skipped.

Next, the color conversion part 114 obtains the upper limits of discharge amounts of inks not causing bleed-through in a case of duplex printing for the above-mentioned red color (R) of the image data. That is, as for the above-mentioned red color (R), the RGB values are converted into the CMYK values. At this time, the ratio of discharge amount (60%=0.6) (obtained in step S141) is reflected. As a result, the color conversion part 114 converts the above-mentioned RGB values (255, 0, 0) of the red color into the CMYK values (0, 153, 153, 0) (i.e., 255×0.6=153). The obtained CMYK values (0, 153, 153, 0) are the upper limits of discharge amounts of inks for the red color (R). Further, also as for the middle tone colors of the red color (R), the values (0, 153, 153, 0) are the upper limits of discharge amounts of inks.

Next, in step S144, the determination part 106 compares for each of the color components other than "0", and determines whether the above-mentioned CMYK values (0, 255, 255, 0) obtained from the color conversion of the image data exceed the CMYK values (0, 153, 153, 0) which are the upper limits of the discharge amounts of inks for the color (red color) of the image data. In this case, the color components other than "0" of the CMYK values (0, 255, 255, 0) of the image data exceed the upper limits (0, 153, 153, 0) (i.e., 255>153) (step S144 YES), and therefore, the CMYK value (0, 153, 153, 0) which are the upper limits are used (step S145). It is noted that in this case, for the CMYK values (0, 255, 255, 0) obtained from the color conversion of the image data, the CMYK values to be actually used for printing are the upper limits (0, 153, 153, 0). The color of the CMYK values (0, 153, 153, 0) to be actually used will be referred to as a "corresponding color" of the color of the CMYK values (0, 255, 255, 0) obtained from the color conversion of the image data.

The above-mentioned example is the case where the image data is of the red color (R). As for one of the middle tone color of the red color (R), for example, RGB (128, 0, 0), RGB (64, 0, 0) or the like, the same operations are carried out. That is, the color conversion part 114 converts the RGB (128, 0, 0) into CMYK (0, 128, 128, 0) or the RGB (64, 0, 0) into CMYK (0, 64, 64, 0). In this case, the CMYK (0, 128, 128, 0) or the CMYK (0, 64, 64, 0) obtained from the color conversion are equal to or less than the above-mentioned upper limits (0, 153, 153, 0) for the respective color components other than "0". In fact, for the respective color components of the CMYK values other than "0", (153≥128, 153≥128), or (153≥64, 153≥64). Therefore, even when these middle tone colors of the red color (R) are formed on both sides of a sheet of paper, no bleed-through of the inks occurs. Thus, it is not necessary to reduce the discharge amounts of inks, and images are formed using the original values (CMYK (0, 128, 128, 0) or CMYK (0, 64, 64, 0)) as they are (step S144 NO→step S146).

Also as for the colors from among the 12 colors of the representative colors other than the red color (R), the same operations are carried out. It is noted that "a middle tone color of a representative color" is defined here as a color having a ratio of the color components other than "0" of those obtained from color separation, which ratio is common to the color and the representative color, and also, the color components other than "0" of the color are smaller than the representative color, respectively. That is, for example, as for RGB data, a color having respective values of RGB (color components) smaller than those of a representative color for the color components other than "0", and having the ratio of the respective values of RGB (color components) for the color components other than "0" common to the color and the representative color is defined as a middle tone color of the representative colors. According to this definition, a color RGB (a, b, c) is a middle tone color of a representative color RGB (A, B, C) in a case where A:B:C=a:b:c, and A>a, B>b and C>c, when A≠0, B≠0 and C≠0. Further, the above-mentioned CMYK values (0, 255, 255, 0) obtained from the color conversion of the image data and the "corresponding color" thereof, i.e., the color of the CMYK values (0, 153, 153, 0) to be actually used, are colors having the common ratio of the color components other than "0" of those obtained from color separation.

Thus, by multiplying the ratio (%) shown in the table of FIG. 4 when the RGB values of the representative color are converted into the CMYK values, it is possible to obtain the upper limits for the representative color and the middle tone colors thereof. Then, in a case where the CMYK values obtained from color conversion of the RGB values of the image data exceed the above-mentioned upper limits when comparing for the respective color components other than "0", the upper limits are used for forming images on both sides of the sheet of paper (step S144 YES→step S145). On the other hand, in a case where the CMYK values obtained from color conversion of the RGB values of the image data do not exceed the above-mentioned upper limits when comparing for the respective color components other than "0", the CMYK values obtained from color conversion are used, as they are, for forming images on both sides of the sheet of paper (step S144 NO→step S146).

Further, as for colors other than the above-mentioned 12 colors of the representative colors and the middle tone colors thereof, the upper limits of discharge amounts of inks are obtained through interpolation operations in the RGB space from the respective points corresponding to the representative colors (step S142). That is, based on the ratios of discharge amounts of inks of the representative colors shown in the table of FIG. 4, interpolation operations are carried out, and the ratios of discharge amounts of inks are obtained for colors other than the representative colors and the middle tone colors thereof. Then, when the RGB values of these colors are converted into the CMYK values, the ratios of discharge amounts of inks thus obtained from the interpolation operations are multiplied, respectively. Thereby, the upper limits of discharge amounts of inks for these colors and the middle tone colors thereof are obtained. Then, in a case where the CMYK values obtained from color conversion of the RGB values of the image data exceed the above-mentioned upper limits when comparing for the respective color components other than "0", the upper limits are used for forming images on both sides of the sheet of paper (step S144 YES→step S145). On the other hand, in a case where the CMYK values obtained from color conversion of the RGB values of the image data do not exceed the above-mentioned upper limits when comparing for the respective color components other than "0", the CMYK values obtained from color conversion are used, as they are, for forming images on both sides of the sheet of paper (step S144 NO→step S146).

It is noted that in step S144, the CMYK values are used for the comparison between the image data and the upper limits. However, it is not necessary to be limited to this example, and instead, the RGB values may be used for the comparison between the image data and the upper limits, or the ratios (%) of discharge amounts of inks may be used for the comparison between the image data and the upper limits.

Further, as the above-mentioned interpolation operations from the representative points, linear interpolation based on the distances from the representative points in the RGB space may be used, for example.

Then, the control part 108 causes the image forming part 102 to discharge the inks according to the discharge amounts of inks thus determined as the CMYK values and form images on both side of the sheet of paper (step S16).

Thus, in the image forming apparatus 10 according to the embodiment 1 of the present invention, the discharge amounts of inks (in the example of FIG. 4, the ratios of discharge amounts of inks) not causing bleed-through of inks when the image forming part 102 forms images on both sides of a sheet of paper are stored as the table of the developer using amount information, for the respective colors (representative colors) for the respective types of sheets of paper. Then, the determination part 108 reads the table, determines discharge amounts of inks (step S14), and the control part 108 causes the image forming part 102 to discharge the inks (step S16). Therefore, since the discharge amounts of inks are controlled when duplex printing is carried out for avoiding bleed-through in a manner suitable for the type of a sheet of paper that is actually used, it is possible to positively avoid bleed-through depending on the type of the actually used sheet of paper.

Further, the determination part 106 reads the table shown in FIG. 4, and determines the discharge amounts of inks separately for the respective colors. Thus, the discharge amounts of inks are not uniformly reduced for all the colors. Therefore, it is possible to improve image quality of images obtained from duplex printing. That is, according to the embodiment 1, it is possible to prevent reducing discharge amounts of inks for colors having no likelihood of causing bleed-through at a time of duplex printing, and it is possible to reduce the discharge amounts of inks within the minimum range when the discharge amounts of inks are reduced. That is, for example, as mentioned above, in a case where the middle tone colors of the red color (R), i.e., RGB (128, 0, 0) and RGB (64, 0, 0), are formed, the discharge amounts of inks are not particularly reduced. Further, even in a case where the discharge amounts of inks are reduced depending on colors, the ranges of reducing can be controlled to the amounts exceeding the upper limits of discharge amounts of inks.

Thus, according to the embodiment 1, it is possible avoid reducing the discharge amounts of inks depending on the colors of image data, or it is possible to control reduction in discharge amounts of inks within the minimum range depending on the colors of image data. As a result, in comparison to a case where discharge amounts of inks are reduced uniformly regardless of the colors of image data, it is possible to minimize reduction in image quality at a time of duplex printing, and as a result, it is possible to improve image quality at a time of duplex printing.

Embodiment 2

Next, an image forming apparatus according to an embodiment 2 of the present invention will be described. Since the image forming apparatus according to the embodiment 2 has a configuration similar to that of the image forming apparatus according to the embodiment 1 described above, the description will be made for points different from the image forming apparatus according to the embodiment 1, and duplicate description will be omitted.

In the image forming apparatus according to the embodiment 1 described above, discharge amounts of inks are reduced within the minimum range, if necessary, separately for the respective colors, as described above, for the purpose of improving image quality at a time of duplex printing (such a method of controlling discharge amounts of inks will be hereinafter simply referred to as an "ink discharge amount adaptively reducing method"). In contrast thereto, as an example of reducing discharge amounts of inks uniformly for the respective colors regardless of the colors, a method of reducing discharge amounts of inks uniformly at a certain ratio regardless of the colors, for the respective types of a sheet of paper to be used, in a case of carrying out duplex printing, will be hereinafter simply referred to as an "ink discharge amount uniformly reducing method".

In a case of the ink discharge amount uniformly reducing method, as the common ratio of discharge amount of ink to all the colors for each of the respective types of a sheet of paper, the lowest one of the ratios of discharge amounts of inks for the type of a sheet of paper in the example of FIG. 4 is used, for example. That is, in a case of using plain paper, the lowest ratio of discharge amount of ink is "60%" in the example of FIG. 4 and is used as the common ratio of discharge amount for all the colors in the case of using plain paper. In the same way, in a case of using a film or tracing paper, the lowest ratio of discharge amount of ink is "40%" in the example of FIG. 4 and is used as the common ratio of discharge amount for all the colors in the case of using a film or tracing paper.

It is noted that when a case of using the ink discharge amount uniformly reducing method and a case of using the ink discharge amount adaptively reducing method are compared with one another, it is possible to reduce discharge amounts of inks in the case of using the ink discharge amount uniformly reducing method. In contrast thereto, it is possible to improve image quality at a time of duplex printing in the case of using the ink discharge amount adaptively reducing method. Therefore, according to the embodiment 2, both the ink discharge amount uniformly reducing method and the ink discharge amount adaptively reducing method are selectively used in the image forming apparatus.

It is noted that the reason why discharge amounts of inks can be reduced more in a case of using the ink discharge amount uniformly reducing method will now be described. According to the ink discharge amount uniformly reducing method, discharge amounts of inks are reduced uniformly regardless of colors, and as mentioned above, the lowest one of the ratios of discharge amounts of inks for each of the respective types of a sheet of paper in the example of FIG. 4 is used as a common ratio of discharge amount of ink to all the colors for the type of a sheet of paper. In contrast thereto, according to the ink discharge amount adaptively reducing method, the lowest one of the ratios of discharge amounts of inks is used only for some of the 12 representative colors as can be seen from FIG. 4, and as for the other colors, higher ratios of discharge amounts of inks are used. Therefore, discharge amounts of inks can be reduced more in a case of using the ink discharge amount uniformly reducing method of using the lowest one of the ratios of discharge amounts of inks in the example of FIG. 4 as a common one to all the colors for each type of a sheet of paper.

Generally speaking, in a case of forming images of graphics (i.e., graphics objects), the user wishes to improve image quality in many cases. Therefore, the image forming apparatus according to the embodiment 2 selects the ink discharge amount adaptively reducing method in a case of forming images of graphics. On the other hand, generally speaking, in a case of forming images of characters/letters (or text images) (i.e., character objects), the user does not particularly wish to improve image quality in many cases. Therefore, the image forming apparatus according to the embodiment 2 selects the ink discharge amount uniformly reducing method of reducing discharge amounts of inks at the same ratio for respective colors in a case of forming images of characters/letters (or text images). As a result, it is possible to reduce discharge amounts of inks in a case of forming images of characters/letters (or text images).

Figure 6:
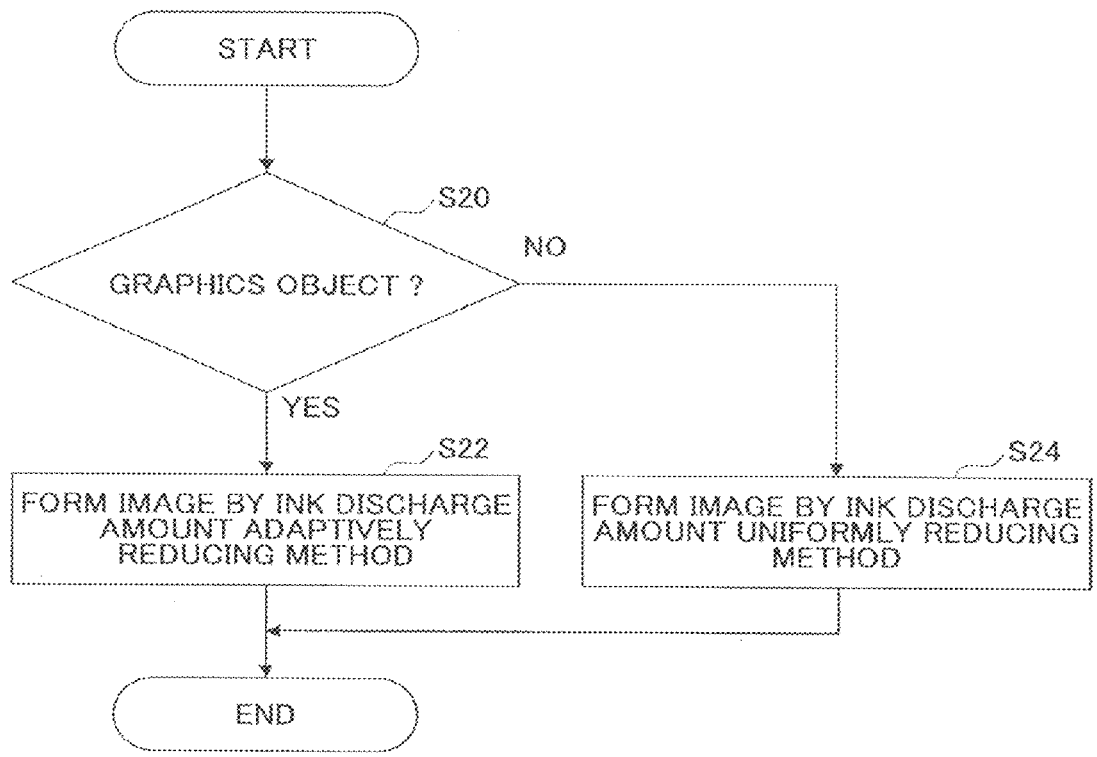
FIG. 6 shows a processing flow of another embodiment of the present invention.

FIG. 6 shows a processing flow of the image forming apparatus according to the embodiment 2. It is noted that it is assumed that the operation of step S10 in FIG. 3A, i.e., the user's inputting from the input part 17 instructions to form images on both sides of a sheet of paper, has been already carried out. Further, the control unit 11 of the image forming apparatus according to the embodiment 2 has the same configuration as that described above with reference to FIG. 2. First, a first detection part 110 shown in FIG. 2 determines whether the object of the image data is a certain object (step S20). It is noted that "object" means information of a minimum unit which cannot be further divided. Objects may include image objects, graphics objects, character objects, line objects and the like.

The "certain object" is an object for which image quality at a time of duplex printing is to be improved, and for example, is a graphics object. Below, the description will be made supposing that the certain object is a "graphics object".

When the first detection part 110 determines that the object of the image data is a graphics object (step S20 YES), the flow proceeds to step S22. Then, the control part 108 causes the image forming part 102 to discharge inks and form images at discharge amounts of inks determined by the determination part 106 according to the ink discharge amount adaptively reducing method (step S22). In this regard, in FIG. 6, for the sake of simplification, the simple statement "form image by ink discharge amount adaptively reducing method" is indicated.

When the first detection part 110 determines that the object of the image data is not a graphics object, i.e., for example, determines that the object of the image data is a character object (step S20 NO), the flow proceeds to step S24. Then, the control part 108 causes the image forming part 102 to discharge inks to form images at discharge amounts of inks reduced at a fixed ratio for all the colors according to the ink discharge amount uniformly reducing method (step S24). That is, in step S24, inks are discharged at discharge amounts determined according to the ink discharge amount uniformly reducing method.

Thus, in the image forming apparatus according to the embodiment 2, a method of forming images according to the ink discharge amount adaptively reducing method or a method of forming images according to the ink discharge amount uniformly reducing method is selected depending on a type of an object for which an image is formed. In particular, in a case where an object for which an image is formed is an object (for example, a graphics object) for which image quality is to be improved at a time of duplex printing, inks are discharged according to the ink discharge amount adaptively reducing method. In contrast thereto, in a case where an object for which an image is formed is an object (for example, a character object) for which it is not necessary to improve image quality at a time of duplex printing, inks are discharged according to the ink discharge amount uniformly reducing method. Therefore, according to the image forming apparatus in the embodiment 2, it is possible to reduce discharge amounts of inks and improve image quality in a manner depending on a type of an object for which an image is formed.

It is noted that selection of an image forming method according to the ink discharge amount adaptively reducing method or an image forming method according to the ink discharge amount uniformly reducing method may be made as a result of the user inputting by a corresponding operation from the input part 17.

Embodiment 3

Next, an image forming apparatus according to an embodiment 3 of the present invention will be described. Since the image forming apparatus according to the embodiment 3 has a configuration similar to that of the image forming apparatus according to the embodiment 1 described above, the description will be made for points different from the image forming apparatus according to the embodiment 1, and duplicate description will be omitted. Also in the embodiment 3, the same as the embodiment 2, control of discharge amounts of inks according to the ink discharge amount uniformly reducing method and control of discharge amounts of inks according to the ink discharge amount adaptively reducing method are selectively used.

Generally speaking, as printing modes, there are 1-pass printing, 2-pass printing, 4-pass printing and so forth (hereinafter, these printing modes will be referred to as "the number of passes"). The 1-pass printing is a mode in which the number of times of scanning of the image forming part 102 (i.e., the recording head) on a sheet of paper when one line of image is formed on the sheet of paper is one (1). That is, one line of image is formed on a sheet of paper through one time of scanning of the recording head. On the other hand, the 4-pass printing is a mode in which one line of image is formed on a sheet of paper through four times of scanning of the recording head. In this case, during one time of scanning among the four times of scanning, only a part of one line of image is formed, and the entirety of one line of image is formed through four times of scanning. Similarly, according to the 2-pass printing, the entirety of one line of image is formed through two times of scanning of the recording head.

Generally speaking, in a case of 1-pass printing, the user wishes high-speed printing, and does not particularly wish to improve image quality, in many cases. Therefore, in this case, the control part 108 carries out duplex printing according to the ink discharge amount uniformly reducing method. On the other hand, for example, in a case of 4-pass printing, the user does not wish high-speed printing but wishes to improve image quality, in many cases. Therefore, in this case, the control part 108 carries out duplex printing according to the ink discharge amount adaptively reducing method.

Figure 7:
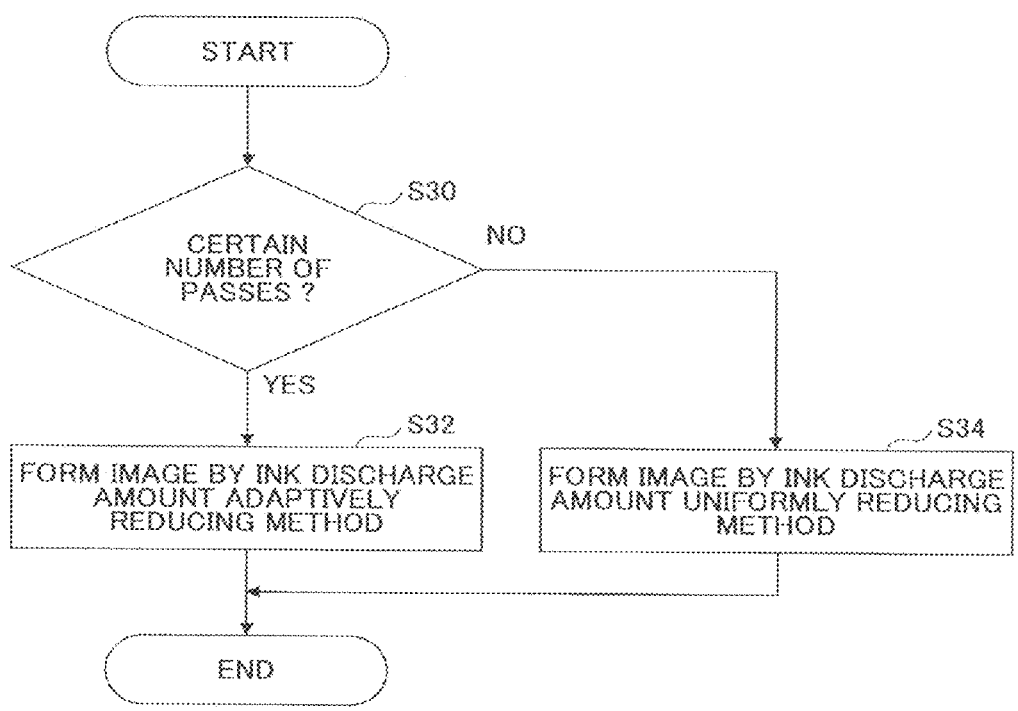
FIG. 7 shows a processing flow of yet another embodiment of the present invention.

FIG. 7 shows a processing flow of the image forming apparatus according to the embodiment 3. It is noted that it is assumed that the operation of step S10 in FIG. 3A, i.e., the user's inputting from the input part 17 instructions to form images on both sides of a sheet of paper, has been already carried out. Further, the control unit 11 of the image forming apparatus according to the embodiment 3 has the same configuration as that described above with reference to FIG. 2. First, a second detection part 112 shown in FIG. 2 detects the number of passes. The number of passes may be set as a default value, or may be set by the user.

Then, the second detection part 112 determines in step S30 whether the detected number of passes is equal to or more than a certain value S. The certain value S is previously determined, and, for example, a setting is made such as S=2 (i.e., 2-pass printing) or S=4 (i.e., 4-pass printing). The certain value S is previously stored in the storage part 30.

When the second detection part 112 determines that the detected number of passes is equal to or more than the certain value S (step S30 YES), the flow proceeds to step S32. The case where the number of passes is equal to or more than the certain value S is a case where improvement of image quality is desired. In step S32, the control part 108 causes the image forming part 102 to form images based on the ratios of discharge amounts of inks determined according to the ink discharge amount adaptively reducing method.

On the other hand, when the second detection part 112 determines that the detected number of passes is less than the certain value S (i.e., the number of passes is "1", i.e., 1-pass printing, supposing S=2) (step S30 NO), the flow proceeds to step S34. The case where the number of passes is less than the certain value S is a case where improvement of image quality is not particularly desired. In step S34, the control part 108 causes the image forming part 102 to form images in such a manner of reducing the discharge amounts of inks for the respective colors at a fixed ratio according to the ink discharge amount uniformly reducing method.

According to the image forming apparatus of the embodiment 3, based on the number of passes, image forming according to the ink discharge amount adaptively reducing method or image forming according to the ink discharge amount uniformly reducing method is selected. That is, in a case where the number of passes is a value (for example, "2" or "4") at which image quality is to be improved when images are formed in duplex printing, inks are discharged according to the ink discharge amount adaptively reducing method. In a case where the number of passes is a value (for example, "1") at which image quality is not particularly to be improved when images are formed in duplex printing, inks are discharged according to the ink discharge amount uniformly reducing method. Thus, it is possible to reduce discharge amount of inks and also improve image quality, in a manner depending on the number of passes.

Experiment

Figure 8A:
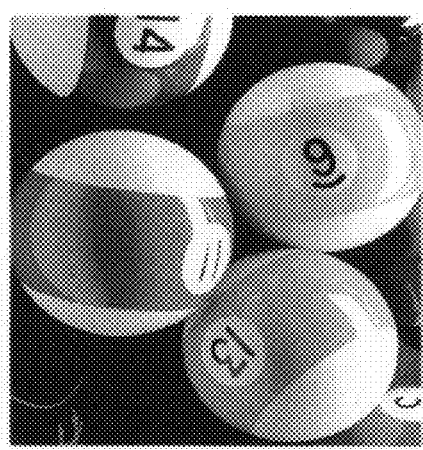
FIGS. 8A, 8B and 8C show color images formed by an image forming apparatus in the related art and an image forming apparatus according to the embodiment of the present invention, respectively, for the purpose of comparison therebetween.
Figure 8B:
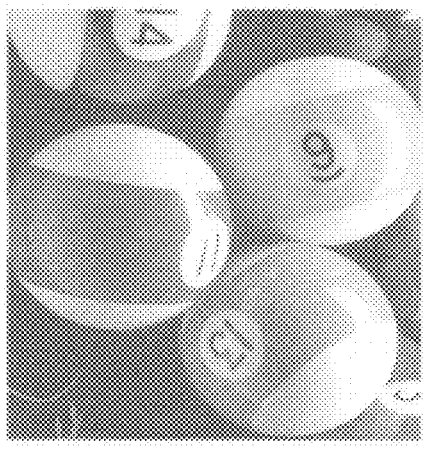
Figure 8C:
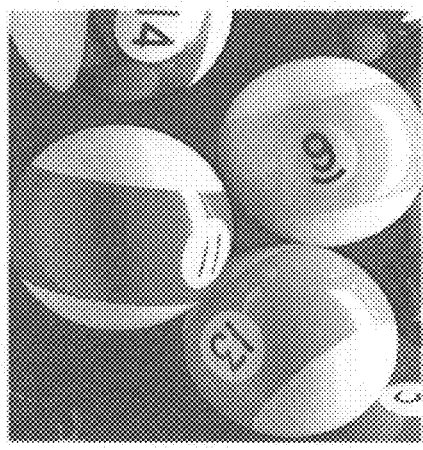

Next, experimental results showing advantageous effects of the image forming apparatus according to the embodiments of the present invention will be described. FIGS. 8A, 8B and 8C show experimental results. FIG. 8A shows an image of image data; FIG. 8B shows an image on a front side of a sheet of paper on which duplex printing is carried out based on the image data according to the art of Japanese Laid-Open Patent Application No. 2007-118238 mentioned above; and FIG. 8C shows an image on a front side of a sheet of paper on which duplex printing is carried out based on the image data according to the embodiment 1 of the present invention. It is also possible to consider that FIG. 8B shows a printed image in a case of using the above-mentioned ink discharge amount uniformly reducing method and FIG. 8C shows a printed image in a case of using the above-mentioned ink discharge amount adaptively reducing method.

The image of FIG. 8C has image quality clearly higher than that of the image of FIG. 8B when FIGS. 8B and 8C are compared. Thus, it can be seen that according to the image forming apparatus in the embodiments of the present invention, image quality is clearly improved at a time of duplex printing in comparison to the image forming apparatus in the related art.

The present invention is not limited to the specifically disclosed embodiments, and variations and modifications may be made without departing from the scope of the present invention.

The present patent application is based on Japanese Priority Patent Application No. 2010-280074, filed Dec. 16, 2010 and Japanese Priority Patent Application No. 2011-264017, filed Dec. 1, 2011, the entire contents of which are hereby incorporated herein by reference.

What is claimed is:

1. An image forming apparatus, comprising:
an image forming part configured to form images on both sides of a recording medium using developers based on image data;
a storing part configured to store developer using amount information for obtaining using amounts of the developers not causing bleed-through of the developers when the image forming part forms the images on both sides of the recording medium, the developer using amount information including plural items of developer using amount information which are separately set for respective colors of the image data; and
a control part configured to cause the image forming part to use the developers and reduce using amounts of the developers in a case of having determined, based on the plural items of developer using amount information separately set for respective colors of the image data, to reduce the using amounts of the developers,
wherein the control part is configured to switch between a process of reducing discharge amounts in such a manner that the reduction amounts are different among respective colors depending on a type of sheet of paper and a process of reducing discharge amounts in such a manner that the reduction amounts are uniform throughout respective colors by using a lowest one of ratios of the discharge amounts of ink depending on a type of sheet of paper.

2. The image forming apparatus as claimed in claim 1, wherein
the control part is configured to compare the image data and the plural items of developer using amount information separately set for respective colors of the image data, cause the image forming part to use the developers in a manner of reducing the using amounts of the developers based on the plural items of developer using amount information separately set for respective colors of the image data in a case of having determined, as a result of the comparison, that using amounts of the developers for forming images according to the image data exceed a range of the using amounts of the developers not causing bleed-through of the developers when the images are formed on both sides of the recording medium, and cause the image forming part to use the developers based on the image data in a case of having determined, as a result of the comparison, that using amounts of the developers for forming images according to the image data fall within the range of the using amounts of the developers not causing bleed-through of the developers when the images are formed on both sides of the recording medium.

3. The image forming apparatus as claimed in claim 1, further comprising:
an obtaining part configured to obtain a type of the recording medium, wherein
the plural items of developer using amount information separately set for respective colors of the image data includes plural items of developer using amount information which are separately set for respective types of the image forming medium, and
the control part is configured to cause the image forming part to use the developers in a manner of reducing the using amounts of the developers in a case of having determined based on the item of the developer using amount information which is separately set for the type of the recording medium obtained by the obtaining part from among the plural items of the developer using amount information separately set for respective colors of the image data.

4. The image forming apparatus as claimed in claim 1, wherein
the developer using amount information includes plural items of developer using amount information which are separately set for respective representative colors, and
the control part is configured to obtain upper limits of using amounts of the developers for not causing bleed-through of the developers when the images are formed on both sides of the recording medium, which using amounts of the developers are those for forming the colors of the image data or corresponding colors thereof, based on the plural items of developer using amount information separately set for representative colors; cause the image forming part to use the developers based on the upper limits of using amounts of the developers in a case where using amounts of the developers for forming the images according to the image data exceed the upper limits of using amounts of the developers; and cause the image forming part to use the developers based on using amounts of the developers for forming the images according to the image data in a case where the using amounts of the developers for forming the images according to the image data are equal to or less than the upper limits of using amounts of the developers.

5. The image forming apparatus as claimed in claim 4, wherein
the control part is configured to carry out interpolation operations from points corresponding to the representative colors in a color space, and obtain upper limits of the using amounts of the developers for not causing bleed-through of the developers when the images are formed on both sides of the recording medium, which using amounts of the developers are those for forming the colors of the image data or corresponding colors thereof.

6. The image forming apparatus as claimed in claim 4, wherein
the control part is configured to obtain the upper limits of the using amounts of the developers for not causing bleed-through of the developers when the images are formed on both sides of the recording medium, which using amounts of the developers are those for forming the colors of the image data or corresponding colors thereof, based on the plural items of developer using amount information separately set for representative colors, by carrying out color conversion for converting the image data into data concerning colors of the developers.

7. The image forming apparatus as claimed in claim 6, wherein
the image data is RGB data and the data concerning colors of the developers is CMYK data.

8. The image forming apparatus as claimed in claim 4, wherein
the colors of the image data and the corresponding colors thereof are those having common ratios of color components other than "0" of those obtained from color separation.

9. The image forming apparatus as claimed in claim 1, wherein
the control part is configured to cause the image forming part to use the developers in a manner of reducing the using amounts of the developers in a case of having determined, based on the plural items of developer using amount information separately set for respective colors of the image data, to reduce the using amounts of the developers in a case where an object of the image data is a certain object, and cause the image forming part to use the developers in a manner of reducing using amounts of the developers at a fixed ratio regardless of the colors of the image data in a case where an object of the image data is not the certain object.

10. The image forming apparatus as claimed in claim 1, wherein
the control part is configured to cause the image forming part to use the developers in a manner of reducing the using amounts of the developers in a case of having determined, based on the plural items of developer using amount information separately set for respective colors of the image data, to reduce the using amounts of the developers in a case where the number of times of scanning by the image forming part when one line of image is formed is equal to or more than a certain value, and cause the image forming part to use the developers in a manner of reducing the using amounts of the developers at a fixed ratio regardless of the colors of the image data in a case where the number of times of scanning by the image forming part when one line of image is formed is less than the certain value.

11. The image forming apparatus as claimed in claim 1, wherein selectively reducing the ink discharge amount uniformly in accordance on a type of an object for which an image is formed.

12. The image forming apparatus as claimed in claim 1, wherein upper limits of discharge amounts of inks are obtained through interpolation operation in the RGB space from respective points corresponding to the representative colors.

13. A control method of an image forming apparatus comprising:
forming images on both sides of a recording medium based on image data using developers by an image forming part of the image forming apparatus;
causing the image forming part to use the developers and reduce using amounts of the developers in a case of having determined, based on developer using amount information, to reduce the using amounts of the developers, the developer using amount information being used for obtaining using amounts of developers not causing bleed-through of the developers when the image forming part forms the images on both sides of the recording medium, and the developer using amount information including plural items of developer using amount information being separately set for respective colors of the image data; and
switching between a process of reducing discharge amounts in such a manner that the reduction amounts are different among respective colors depending on a type of sheet of paper and a process of reducing discharge amounts in such a manner that the reduction amounts are uniform throughout respective colors by using a lowest one of ratios of the discharge amounts of ink depending on a type of sheet of paper.

14. A computer readable information recording medium storing a program which, when executed by a control part of an image forming apparatus, controls an image forming part of the image forming apparatus to cause the image forming part to use developers, and reduce using amounts of the developers in a case of having determined, based on developer using amount information, to reduce the using amounts of the developers, the developer using amount information being used for obtaining using amounts of the developers not causing bleed-through of the developers when the image forming part forms images on both sides of a recording medium based on image data, and the developer using amount information including plural items of developer using amount information being separately set for respective colors of the image data, and
switching between a process of reducing discharge amounts in such a manner that the reduction amounts are different among respective colors depending on a type of sheet of paper and a process of reducing discharge amounts in such a manner that the reduction amounts are uniform throughout respective colors by using a lowest one of ratios of the discharge amounts of ink depending on a type of sheet of paper.

* * * * *